(12) United States Patent
Murakami

(10) Patent No.: US 7,123,397 B2
(45) Date of Patent: Oct. 17, 2006

(54) DEFORMABLE MIRROR

(75) Inventor: Kenzi Murakami, Hino (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 11/219,947

(22) Filed: Sep. 6, 2005

(65) Prior Publication Data

US 2006/0055997 A1 Mar. 16, 2006

(30) Foreign Application Priority Data

Sep. 10, 2004 (JP) .............................. 2004-263690

(51) Int. Cl.
G02B 26/08 (2006.01)
(52) U.S. Cl. ...................... 359/224; 359/223; 359/198; 359/291
(58) Field of Classification Search ...................... None
See application file for complete search history.

(56) References Cited

U.S. PATENT DOCUMENTS 5,170,283 A 12/1992 O'Brien et al.

2004/0047051 A1 3/2004 Kaneko
2004/0201908 A1 10/2004 Kaneko
2006/0012851 A1* 1/2006 Wu et al. ................... 359/291

FOREIGN PATENT DOCUMENTS

DE 37 12 145 A1 3/1988
JP 2-101402 4/1990

* cited by examiner

Primary Examiner—James Phan
(74) Attorney, Agent, or Firm—Scully, Scott, Murphy & Presser, P.C.

(57) ABSTRACT

A deformable mirror has a first deforming portion that has a reflection surface, a second deforming portion surrounding the first deforming portion and has lower mechanical stiffness than that of the first deforming portion, a fixing portion fixing a peripheral portion of the second deforming portion, deformer for acting on the first deforming portion to deform the first deforming portion and second deforming portion, and restrictor for restricting deformation in a main deforming direction of a portion of the first deforming portion that is outside an operation region of the deformer.

20 Claims, 16 Drawing Sheets

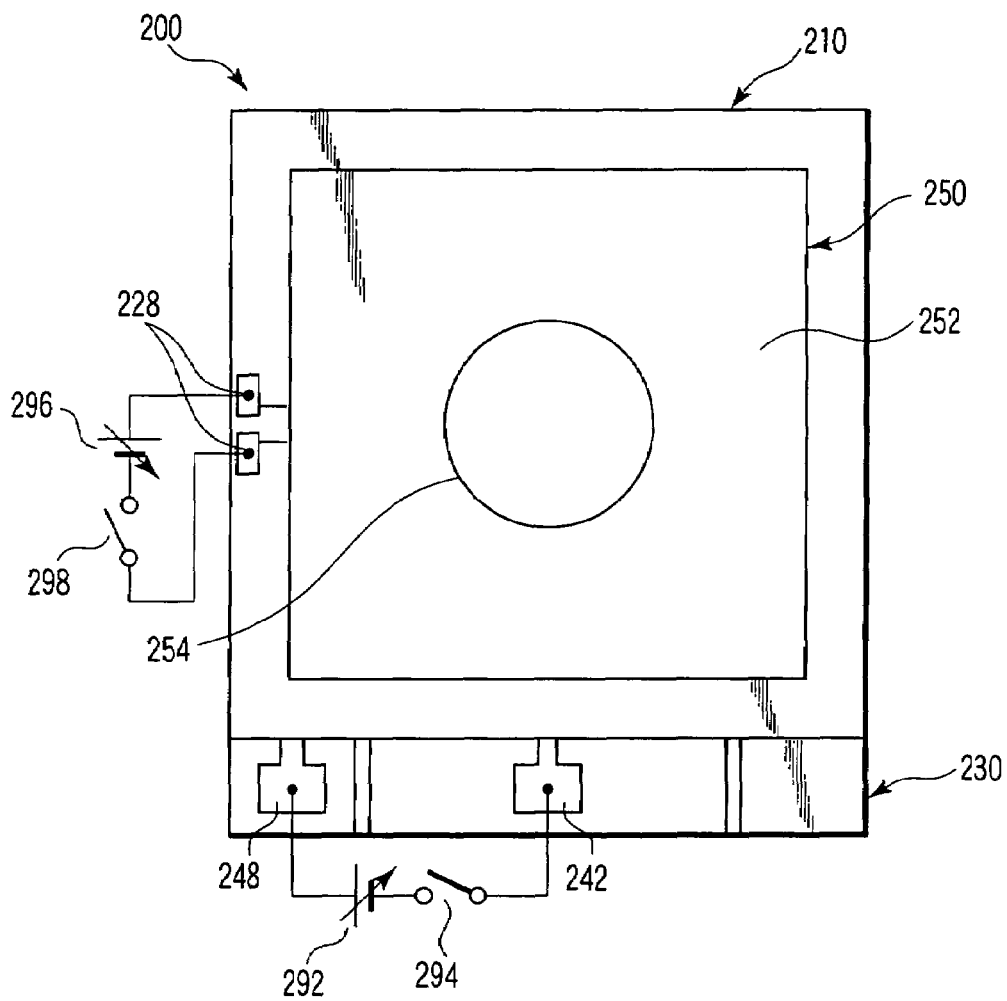
F I G. 28

DEFORMABLE MIRROR

CROSS-REFERENCE TO RELATED APPLICATIONS

This application is based upon and claims the benefit of priority from prior Japanese Patent Application No. 2004-263690, filed Sep. 10, 2004, filed month day, year, the entire contents of which are incorporated herein by reference.

BACKGROUND OF THE INVENTION

1. Field of the Invention

The present invention relates to a deformable mirror the curvature of which can be changed continuously and, more particularly, to a compact deformable mirror to which the semiconductor technique is applied.

2. Description of the Related Art

In recent years, a deformable mirror, which uses the Micro Electro-mechanical Systems technique, attracts attention. For example, a deformable mirror disclosed in Jpn. Pat. Applin. KOKAI Publication No. 2-101402 is an example of a deformable mirror. In this deformable mirror, as shown in FIG. 32, an electrode layer 3 is formed on a semiconductor substrate 1 through an insulating thin film 2. The semiconductor substrate 1 has a cavity 4 that allows central portions 5 of the insulating thin film 2 and electrode layer 3 to displace in the direction of thickness. An electrode layer 7 is formed on the bottom surface of the cavity 4 through an insulating thin film 6. The electrode layers 3 and 7 constitute a pair of opposing electrodes. The electrode layer 3 also serves as a reflection surface. The reflection surface is deformed into a concave by an electro-static force generated upon application of a voltage to the electrode layers 3 and 7.

The application range of the deformable mirror that uses the Micro Electro-mechanical Systems technique is widening, so the deformable mirror will be employed in various types of optical systems. According to one application, a reflection mirror portion is to be largely deformed to a degree that is not available conventionally.

BRIEF SUMMARY OF THE INVENTION

A deformable mirror according to an aspect of the present invention comprises a first deforming portion that has a reflection surface, a second deforming portion surrounding the first deforming portion, and a fixing portion fixing a peripheral portion of the second deforming portion. The second deforming portion has lower mechanical stiffness than that of the first deforming portion. The deformable mirror also has a deformer for acting on the first deforming portion to deform the first and second deforming portions, and a restrictor for restricting deformation in a main deforming direction of the first deforming portion that is outside an acting region of the deformer.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 28 shows an arrangement that applies a voltage for electrostatic driving that deforms the reflection surface of the deformable mirror shown in FIG. 19, and an arrangement that applies a current for generating a restricting force that restricts deformation of the connecting portion of the deformable mirror;

DETAILED DESCRIPTION OF THE INVENTION

Figure 1:
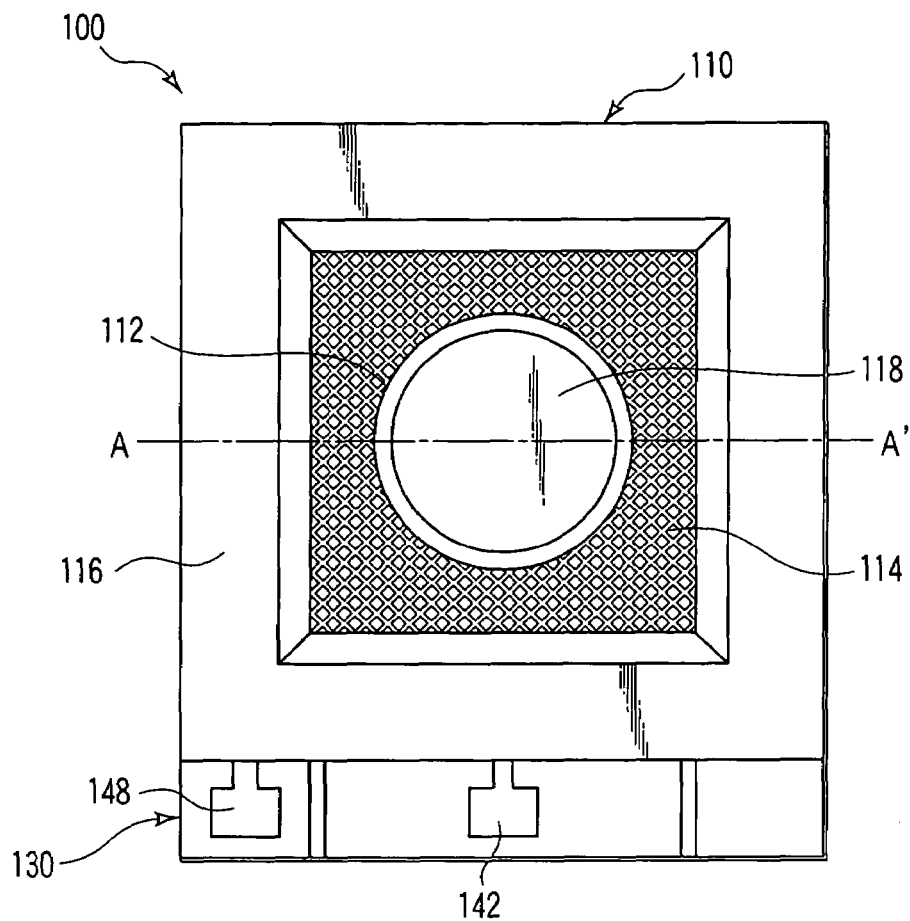
FIG. 1 is a top view of a deformable mirror according to the first embodiment of the present invention.

The embodiments of the present invention will be described with reference to the views of the accompanying drawing.

First Embodiment

The first embodiment will be described with reference to the views of the drawing.

Figure 2:
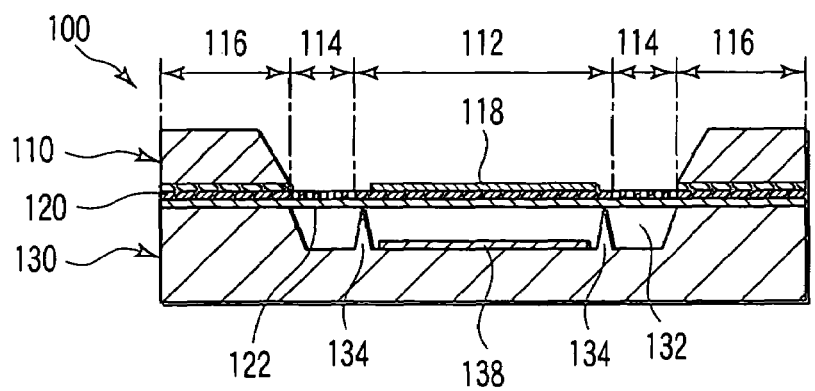
FIG. 2 is a sectional view taken along the line A–A' of FIG. 1.

FIG. 1 is a top view of a deformable mirror according to the first embodiment of the present invention. FIG. 2 is a sectional view taken along the line A–A' of FIG. 1.

As shown in FIGS. 1 and 2, a deformable mirror 100 according to this embodiment comprises a mirror substrate 110 and an electrode substrate 130. The mirror substrate 110 and electrode substrate 130 are bonded to each other.

Figure 3:
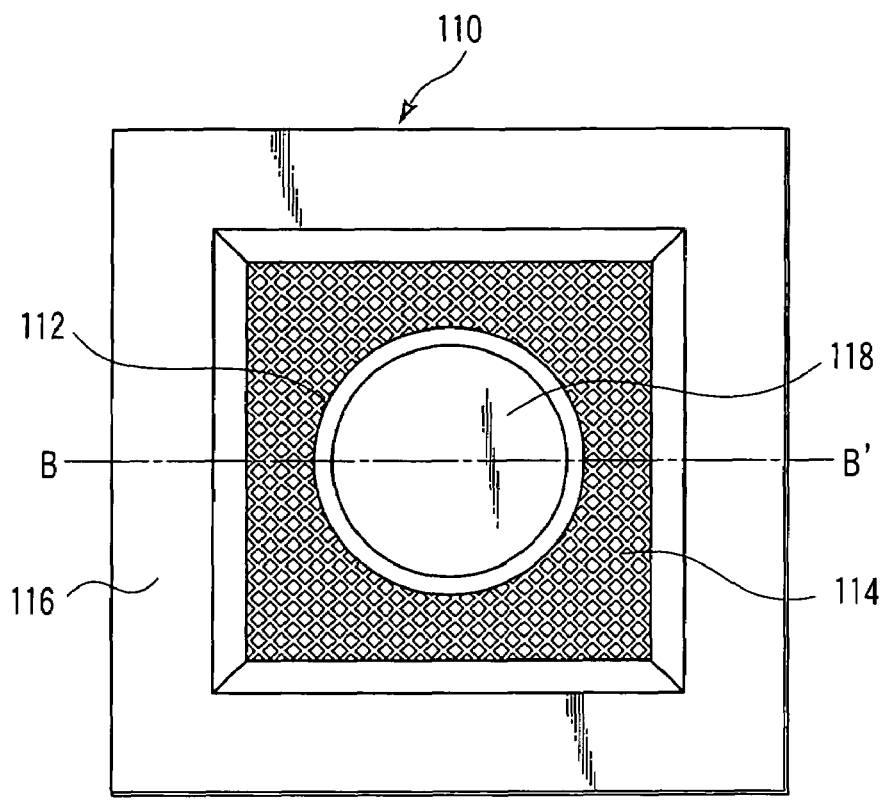
FIG. 3 is a top view of the mirror substrate shown in FIG. 1.
Figure 4:
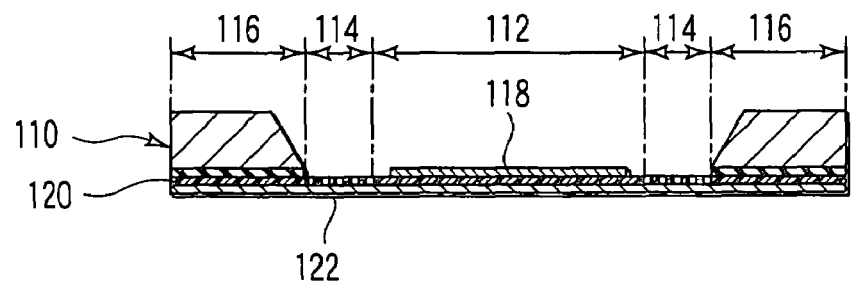
FIG. 4 is a sectional view taken along the line B–B' of FIG. 3.

FIG. 3 is a top view of the mirror substrate shown in FIG. 1. FIG. 4 is a sectional view taken along the line B–B' of FIG. 3.

As shown in FIGS. 3 and 4, the mirror substrate 110 has a membrane 112, a connecting portion 114 surrounding the membrane 112, and a fixing portion 116 fixing the peripheral portion of the connecting portion 114. The upper surface (the surface that corresponds to the upper side in FIG. 4) of the membrane 112 is provided with a reflection surface 118. The mirror substrate 110 is fabricated from a silicon substrate. Both the membrane 112 and connecting portion 114 comprise a polyimide thin film extending from the fixing portion 116. The membrane 112 constitutes a deforming portion, and the connecting portion 114 constitutes another deforming portion. The connecting portion 114 is provided with many through holes so as to form a mesh, and has lower mechanical stiffness than that of the membrane 112. The membrane 112 and connecting portion 114 are provided with a GND conductive thin film 122 on their entire surfaces (until the fixing portion 116) that are opposite to a surface on which the reflection surface 118 is formed. The GND conductive thin film 122 constitutes a GND layer in electrostatic driving that deforms the membrane 112 (to be described later).

Figure 5:
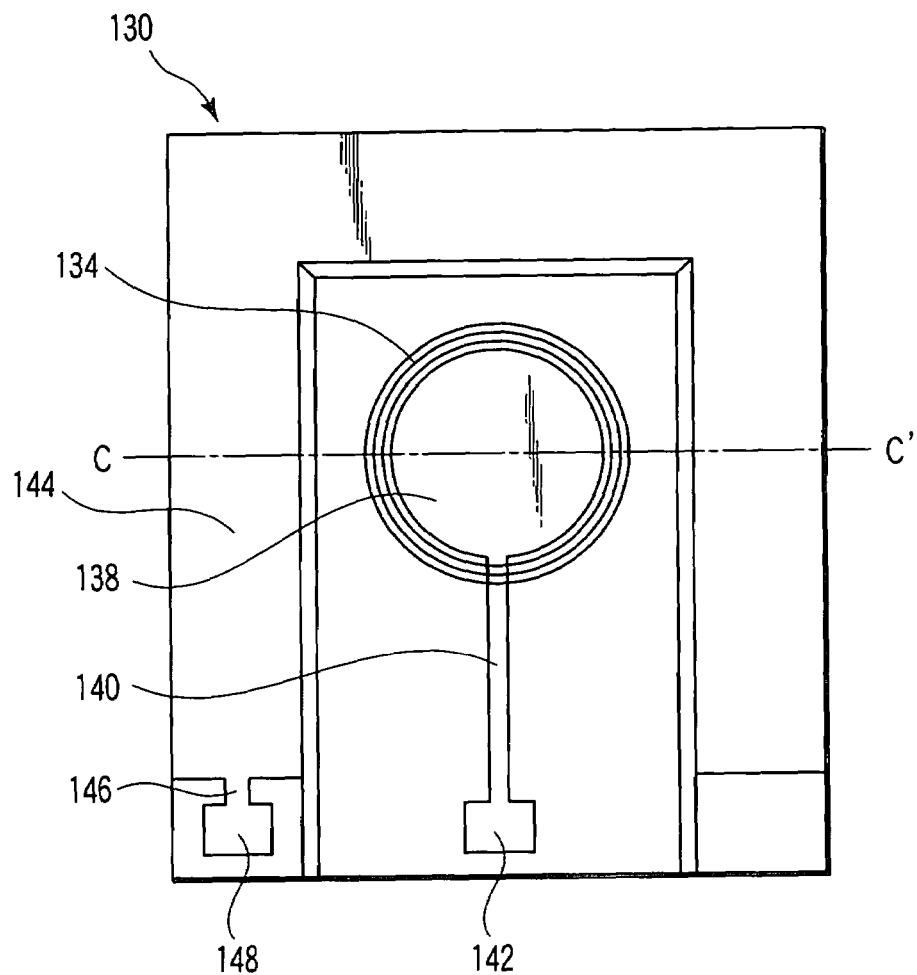
FIG. 5 is a top view of the electrode substrate shown in FIG. 1.
Figure 6:
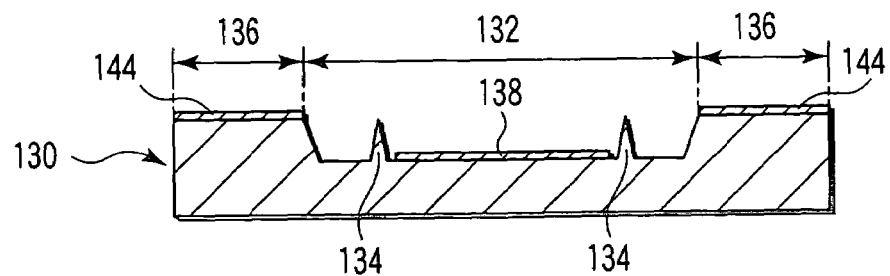
FIG. 6 is a sectional view taken along the line C–C' of FIG. 5.

FIG. 5 is a top view of the electrode substrate shown in FIG. 1. FIG. 6 is a sectional view taken along the line C–C' of FIG. 5.

As shown in FIGS. 5 and 6, the electrode substrate 130 is provided with a recess 132 at a portion that opposes the membrane 112 and connecting portion 114. The recess 132 corresponds to an electrostatic gap. The electrode substrate 130 is also provided with a projection 134, which extends circularly at a position opposing the circumference of the membrane 112. The electrode substrate 130 is provided with a driving electrode 138 at a region surrounded by the projection 134. The driving electrode 138 is electrically connected to a driving-electrode extending electrode 142 through a driving-electrode wiring line 140, which extends beyond the projection 134. The electrode substrate 130 is provided with a conductive thin film 144 at a bonding portion 136, which opposes the fixing portion 116 when the electrode substrate 130 is bonded to the mirror substrate 110. The conductive thin film 144 is electrically connected to a GND extending electrode 148 through a wiring line 146. The electrode substrate 130 is fabricated from a silicon substrate. The electrode substrate 130 is larger than the mirror substrate 110. As shown in FIG. 1, the driving-electrode extending electrode 142 and GND extending electrode 148 are formed on the electrode substrate 130 at a portion that extends outside the mirror substrate 110 when the mirror substrate 110 is bonded to the electrode substrate 130.

As shown in FIGS. 1 and 2, the mirror substrate 110 and electrode substrate 130 are bonded through the fixing portion 116 and bonding portion 136 so that the membrane 112 opposes the driving electrode 138. Thus, the membrane 112 of the mirror substrate 110 is electrically connected to the conductive thin film 144 of the electrode substrate 130. That portion of the GND conductive thin film 122 which is located on the membrane 112 of the mirror substrate 110 opposes the driving electrode 138 of the electrode substrate 130 at a gap. The opposing portion of the GND conductive thin film 122 and the driving electrode 138 of the electrode substrate 130 constitute deforming means or a deformer for deforming the membrane 112 and connecting portion 114. In other words, that portion of the conductive thin film 144 which is located on the membrane 112 serves as a counter electrode with respect to the driving electrode 138. The counter electrode and the driving electrode 138 constitute electrostatic driving that deforms the membrane 112 by an electro-static force. The projection 134 of the electrode substrate 130 has a tip that is configured to come into contact with the lower surface (the surface opposite to the reflection surface 118) of the membrane 112. The projection 134 constitutes restricting means or a restrictor for restricting deformation in the main deforming direction of the connecting portion 114 of the mirror substrate 110.

A method of fabricating the deformable mirror 100 according to this embodiment will be described.

Figure 7A:
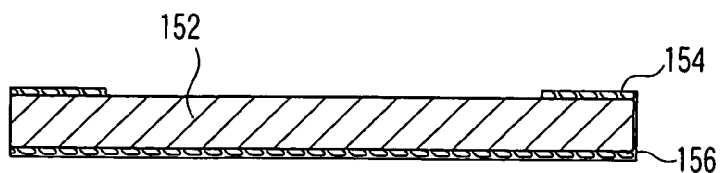
FIGS. 7A, 7B, 7C, 7D, 7E, 7F, and 7G show a method of fabricating a mirror substrate shown in FIG. 1.
Figure 7B:
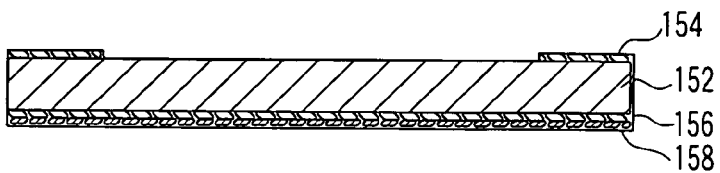
Figure 7C:
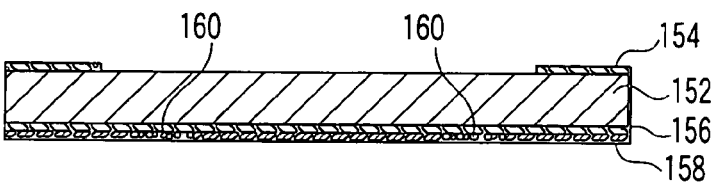
Figure 7D:
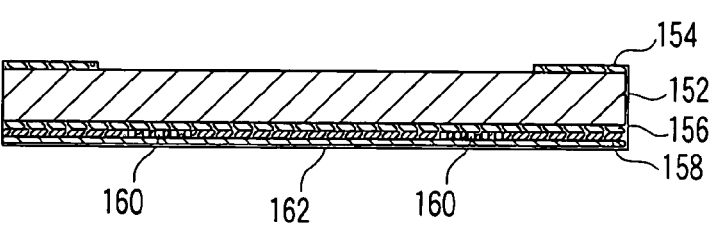
Figure 7E:
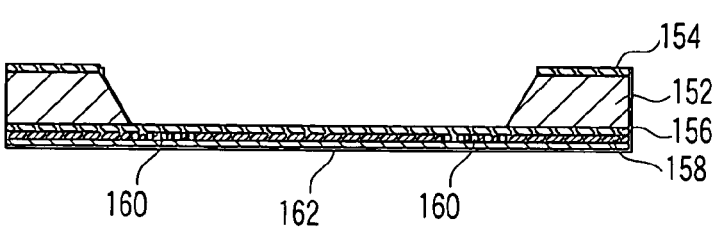
Figure 7F:
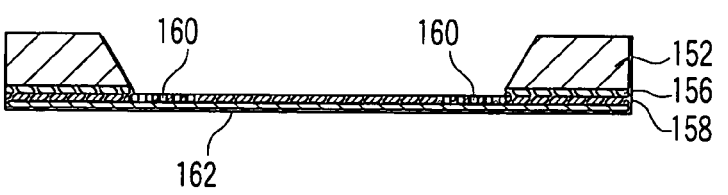
Figure 7G:
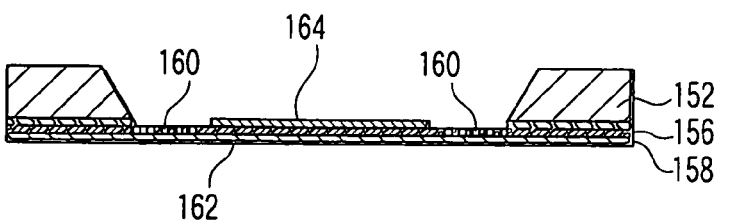

First, a method of fabricating the mirror substrate 110 will be described with reference to FIGS. 7A to 7G. The mirror substrate 110 is fabricated from a silicon substrate as a base material. As shown in FIG. 7A, silicon nitride films 154 and 156 are formed on the two surfaces of a silicon substrate 152 by LPCVD. The silicon nitride film 154 formed on the lower surface is patterned to form a mask to form a through hole through which the membrane 112 and connecting portion 114 are to be exposed. The silicon nitride film 156 formed on the upper surface is used as an etching stop layer used when removing the silicon substrate 152 from the lower surface by etching, i.e., is used to end etching. As shown in FIG. 7B, a polyimide film 158 is formed on the silicon nitride film 156 on the upper surface. The polyimide film 158 forms the prospective membrane 112 and connecting portion 114. Polyimide is an organic soft material and is accordingly advantageous in largely deforming the membrane 112. Subsequently, as shown in FIG. 7C, many through holes are formed in that portion of the polyimide film 158 which forms the prospective connecting portion 114 to make it a mesh. This decreases the mechanical stiffness of the connecting portion 114. As shown in FIG. 7D, a conductive thin film 162 such as an aluminum film is formed on the entire surface of the polyimide film 158 by sputtering. The conductive thin film 162 forms the prospective GND conductive thin film 122. As the conductive thin film 162 increases the mechanical stiffness of the membrane 112, it is desirably formed as thin as possible. As shown in FIG. 7E, the silicon substrate 152 is removed from the lower surface by anisotropic etching. Etching stops at the silicon nitride film 156 formed on the upper surface. As shown in FIG. 7F, the silicon nitride film 156 used as the etching stop layer is removed by a plasma etching apparatus. Subsequently, as shown in FIG. 7G, an aluminum film 164, which forms the prospective reflection surface 118, is formed using a metal mask. Although not shown, a silicon oxide film for preventing oxidization may be further formed on the aluminum film 164.

Figure 8A:
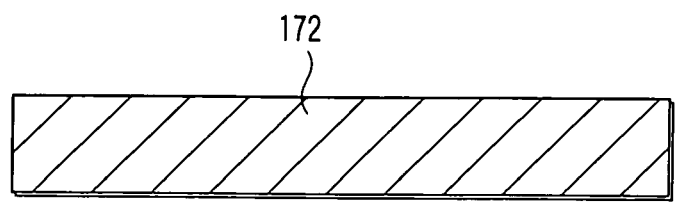
FIGS. 8A, 8B, 8C, 8D, and 8E show a method of fabricating an electrode substrate shown in FIG. 1.
Figure 8B:
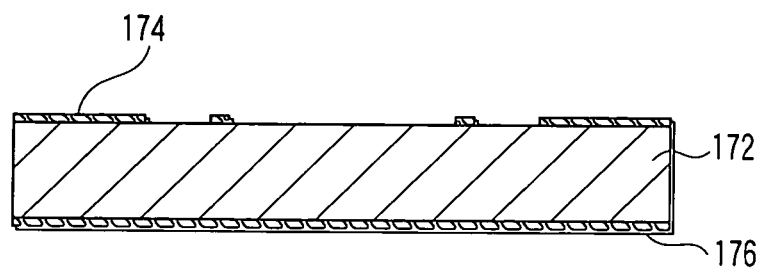
Figure 8C:
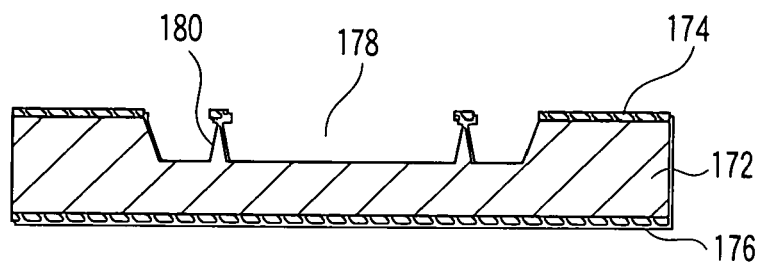
Figure 8D:
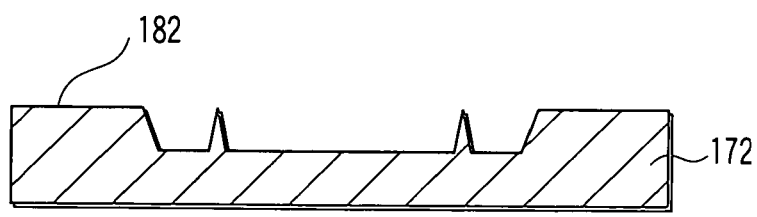
Figure 8E:
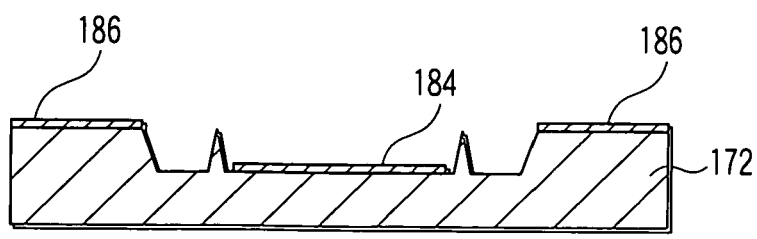

A method of forming an electrode substrate will be described with reference to FIGS. 8A to 8E. First, as shown in FIG. 8A, a silicon substrate 172 is prepared. As shown in FIG. 8B, silicon oxide films 174 and 176 are formed on the two surfaces of the silicon substrate 172. The silicon oxide film 174 formed on the upper surface is removed except for portions that form the prospective projection 134 and bonding portion 136. As the projecting portion is circular, it requires a compensating mask pattern when the silicon substrate 172 is to be processed by anisotropic etching. Subsequently, as shown in FIG. 8C, the silicon substrate 172 is removed using the patterned silicon oxide film 174 as a mask to form a recess 178 and a projection 180. The recess 178 corresponds to the recess 132. The projection 180 corresponds to the projection 134. The depth of the recess 178 is determined in accordance with the deformation amount of the reflection surface 118. The recess 178 is formed to have a depth three times or more the maximal displacement amount of the membrane 112. This is to particularly consider the Pull-in condition (the pulling phenomenon of the membrane 112 toward the driving electrode). The recess 178 corresponds to the electrostatic gap in electrostatic driving. The projection 180, which forms the prospective projection 134, has a sharp tip, as shown in FIG. 8C. The projection 180 desirably has the same height as that of the bonding portion 136. After the recess 132 is formed, the silicon oxide films 174 and 176 are temporarily removed. A silicon oxide film 182 is formed again as an insulating layer on the entire surface. As shown in FIG. 8E, metal films 186 and 184 are formed using a metal mask. The metal film 186 corresponds to the conductive thin film 144, wiring line 146, and GND extending electrode 148. The metal film 184 corresponds to the driving electrode 138, driving-electrode wiring line 140, and driving-electrode extending electrode 142. For example, a sputtering apparatus is used for this process to form an aluminum film or the like. Although not shown, for avoiding short-circuiting during the Pull-in, a silicon oxide film or the like is formed on the driving electrode portion to achieve insulation.

Figure 9A:
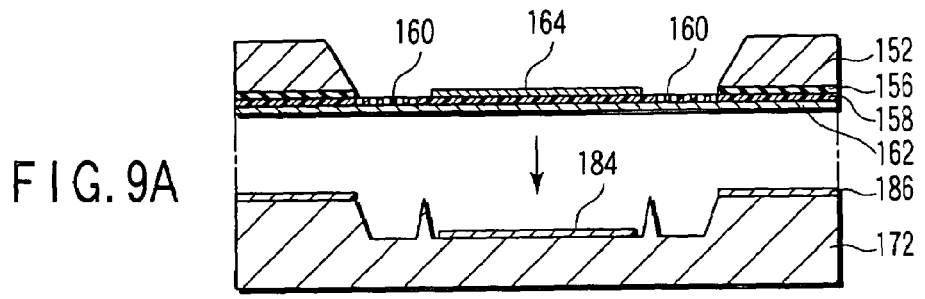
FIGS. 9A and 9B show a method of bonding the mirror substrate shown in FIGS. 7A to 7G and the electrode substrate shown in FIGS. 8A to 8E.
Figure 9B:
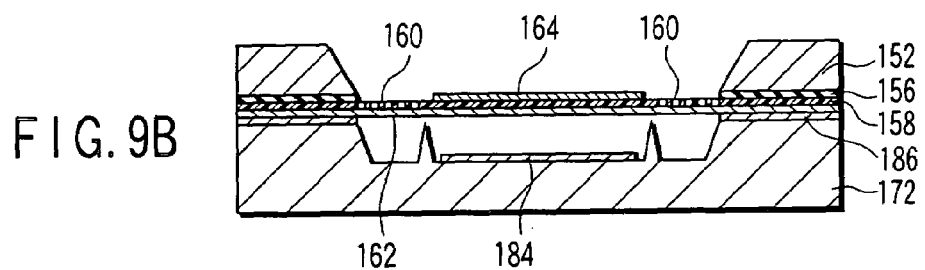

The mirror substrate 110 and electrode substrate 130 are aligned, as shown in FIG. 9A. Then, as shown in FIG. 9B, the mirror substrate 110 and electrode substrate 130 are bonded to each other by a conductive bonding method using a conductive paste or the like. When bonded, it suffices as far as the projection 134 can be in contact with the GND conductive thin film 122 formed on the membrane 112 of the mirror substrate 110. Desirably, the gap between the tip of the projection 134 and the GND conductive thin film 122 is small.

The operation of the deformable mirror 100 according to this embodiment will be described.

Figure 10:
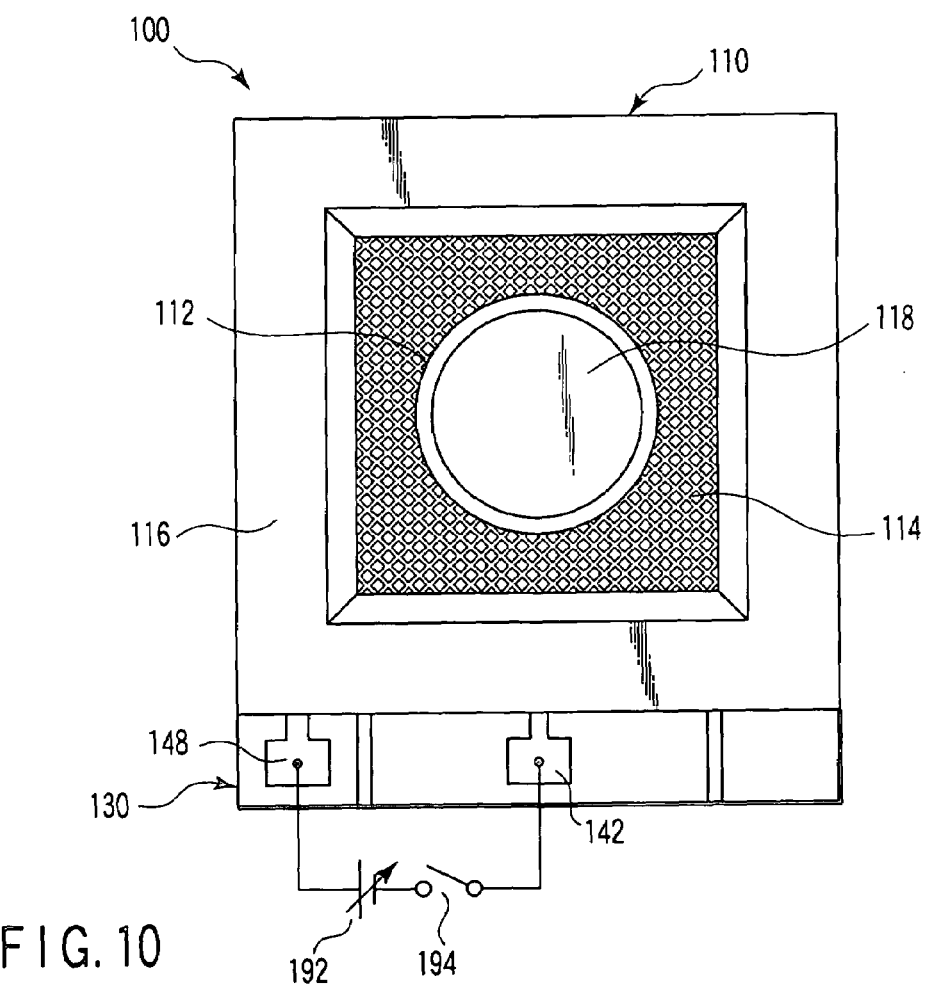
FIG. 10 shows an arrangement that applies a voltage for electrostatic driving that deforms the reflection surface of the deformable mirror shown in FIG. 1.
Figure 11:
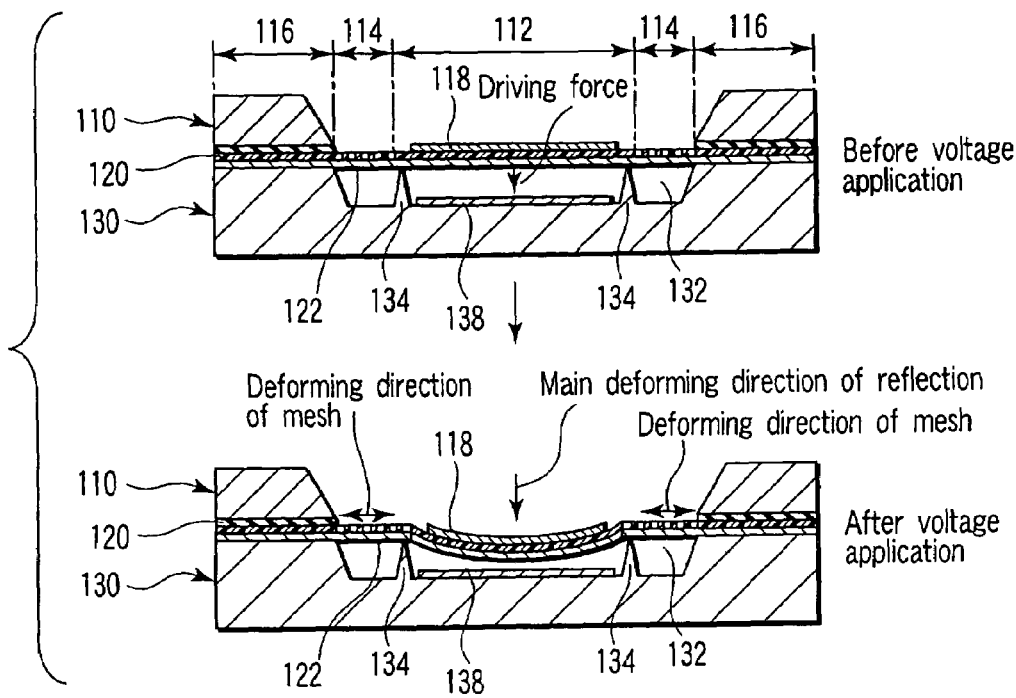
FIG. 11 shows how the reflection surface deforms in response to voltage application of FIG. 10.

FIG. 10 shows an arrangement that applies a voltage for electrostatic driving that deforms the reflection surface of the deformable mirror shown in FIG. 1. FIG. 11 shows how the reflection surface deforms in response to voltage application of FIG. 10.

As shown in FIG. 10, a DC power supply 192 and a switch 194 are connected in series between the GND extending electrode 148 and driving-electrode extending electrode 142. Assume that the switch 194 is closed and that a driving voltage is applied between the GND extending electrode 148 and driving-electrode extending electrode 142. Then, the membrane 112, which has the reflection surface 118, deforms toward the driving electrode 138, as shown in FIG. 11. In this specification, this deforming direction is called the main deforming direction, and is discriminated from, e.g., deformation in the elongating direction that actually occurs in the reflection surface. As the connecting portion 114 forms a mesh, its overall mechanical stiffness is lower than that of the membrane 112. Hence, sometimes the driving force undesirably deforms the connecting portion 114 before the membrane 112 deforms. However, the GND conductive thin film 122 formed on the membrane 112 comes into contact with the projection 134 at the circumference of the membrane 112. Accordingly, the connecting portion 114 located outside the circumference of the membrane 112 cannot deform in the main deforming direction of the reflection surface. This is due to the presence of the projection 134.

The tip of the projection 134 is preferably formed sharp. Then, the contact area of the membrane 112 and GND conductive thin film 122 decreases. This minimizes the friction between the projection 134 and membrane 112 that occurs when the membrane 112 deforms. Accordingly, the membrane 112 deforms smoothly. The mesh formed in the connecting portion 114 deforms in a direction to relax the tensile stress occurring in the planar direction of the membrane 112. Thus, the tensile stress occurring in the membrane 112 is decreased largely. More specifically, as shown in FIG. 11, as the mesh extends in its planar direction to relax the tensile stress, the membrane 112 (i.e., the reflection surface 118) can deform largely.

In the deformable mirror 100 of this embodiment, when the membrane 112 deforms, the through holes in the mesh portion formed in the connecting portion 114 enlarge. Accordingly, the tensile stress occurring in the membrane 112 is relaxed. Thus, the membrane 112 can be easily, largely deformed. This is apparent from the above description.

Various changes and modifications can naturally be made in the respective arrangements of this embodiment.

Figure 12:
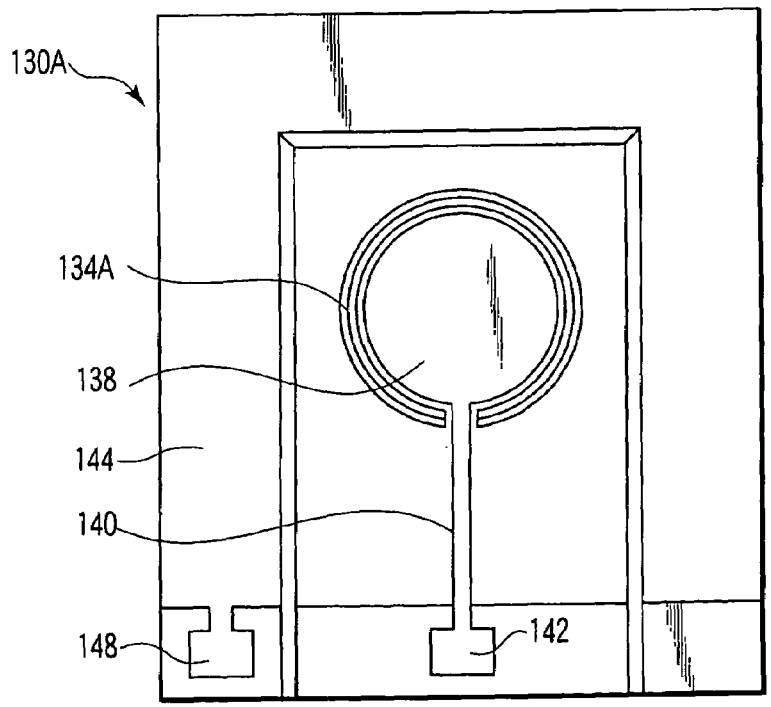
FIG. 12 shows an electrode substrate according to a modification to the first embodiment of the present invention.

FIG. 12 shows an electrode substrate according to a modification to the first embodiment of the present invention. As shown in FIG. 12, in an electrode substrate 130A of this modification, a projection 134A has a clearance at a portion where the driving-electrode wiring line 140 extending from the driving electrode 138 runs. In the embodiment described above, the sharper the tip of the projection 134 is, the more smoothly the membrane 112 can be deformed. However, the sharp tip of the projection 134 may undesirably disconnect the driving-electrode wiring line 140 extending beyond the projection 134. It is thus very difficult to fabricate a good projection 134. In view of this, according to this modification, after the projection 134 is formed, a portion through which the prospective driving-electrode wiring line 140 passes is removed. Thus, the projection 134A is formed so as to have a clearance at a portion where the driving-electrode wiring line 140 runs. After that, the driving-electrode wiring line 140 is formed. This avoids the problem of disconnection. Note that the projection 134A largely adversely affects the deforming shape of the reflection surface 118, particularly the deforming shape near the peripheral portion of the reflection surface 118. Near the removed portion of the projection 134A, the deforming shape of the reflection surface may be degraded. Hence, the portion to be removed is desirably suppressed to the necessary minimum. In other words, in the electrode substrate 130A of this modification, the driving-electrode wiring line 140 resists being disconnected and is fabricated easily.

Figure 13:
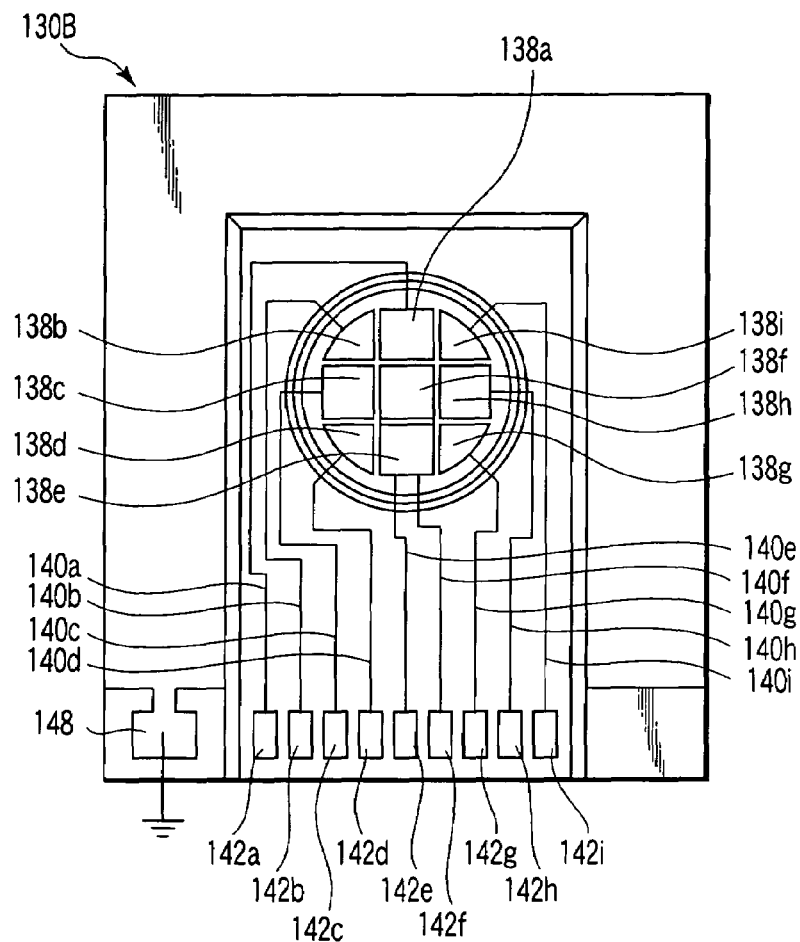
FIG. 13 shows an electrode substrate according to another modification to the first embodiment of the present invention.
Figures 14, 15:
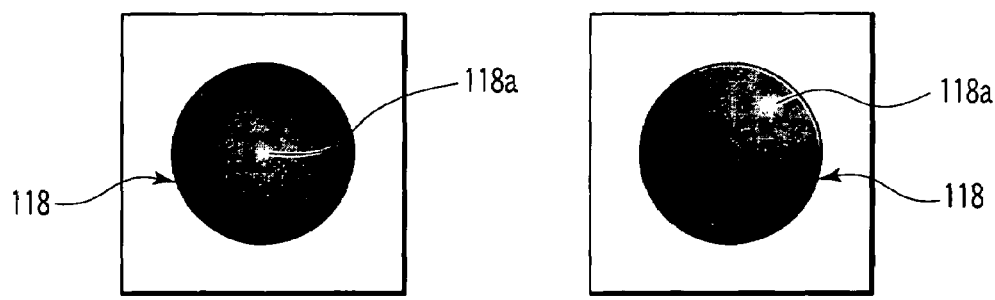
FIG. 14 shows a membrane seen from above when the same voltage is applied to all of the nine electrode portions shown in FIG. 13.
FIG. 15 shows the membrane seen from above when, of the nine electrode portions shown in FIG. 13, a high voltage is applied to the upper right electrode portion and a low voltage is equally applied to the remaining electrode portions.
Figure 16:
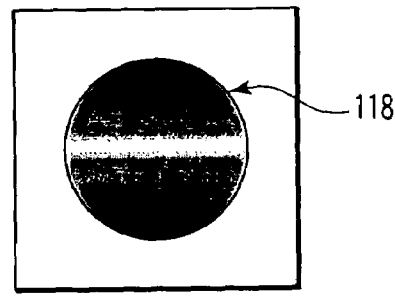
FIG. 16 shows the membrane seen from above when, of the nine electrode portions shown in FIG. 13, a high voltage is applied to the three electrode portions at the middle stage and a low voltage is equally applied to the remaining electrode portions.

FIG. 13 shows an electrode substrate according to another modification to the first embodiment of the present invention. As shown in FIG. 13, in an electrode substrate 130B of this modification, the driving electrode comprises nine electrode portions 138a to 138i. The electrode portions 138a to 138i are electrically independent of each other. The electrode portions 138a to 138i are respectively electrically connected to driving-electrode extending electrodes 142a to 142i through driving-electrode wiring lines 140a to 140i. When the driving electrode comprises the electrode portions 138a to 138i in this manner, a complicated reflection surface shape that cannot be realized by a single driving electrode can be realized. For example, FIG. 14 shows the membrane 112 seen from above when the same voltage is applied to all the electrode portions 138a to 138i. In response to this driving, the reflection surface 118 deforms into a concave surface with an optical axis 118a located at its center. This shape is the same as that obtained by driving using a single driving electrode. FIG. 15 shows the membrane 112 seen from above in the following case. Namely, a high voltage is applied to the upper right electrode portion 138i. A voltage lower than the voltage applied to the upper right electrode portion 138i is equally applied to the remaining electrode portions 138a to 138h. In response to this driving, the reflection surface 118 deforms into a concave curved surface with the optical axis 118a shifted to the upper right, as is apparent from FIG. 15. FIG. 16 shows the membrane 112 seen from above in the following case. Namely, a high voltage is applied to the three electrode portions 138c, 138f, and 138h at the middle stage. A voltage lower than the voltage applied to the three electrode portions 138c, 138f, and 138h at the middle stage is equally applied to the remaining electrode portions 138a, 138b, 138d, 138e, 138g, and 138i. In response to this driving, the reflection surface 118 deforms to a curved surface similar to a cylindrical surface, as is apparent from FIG. 16. In this manner, when the electrode substrate 130B of this modification is used, the deforming shape of the reflection surface 118 can be changed freely. Thus, the application range of the deformable mirror can be widened.

Figure 17:
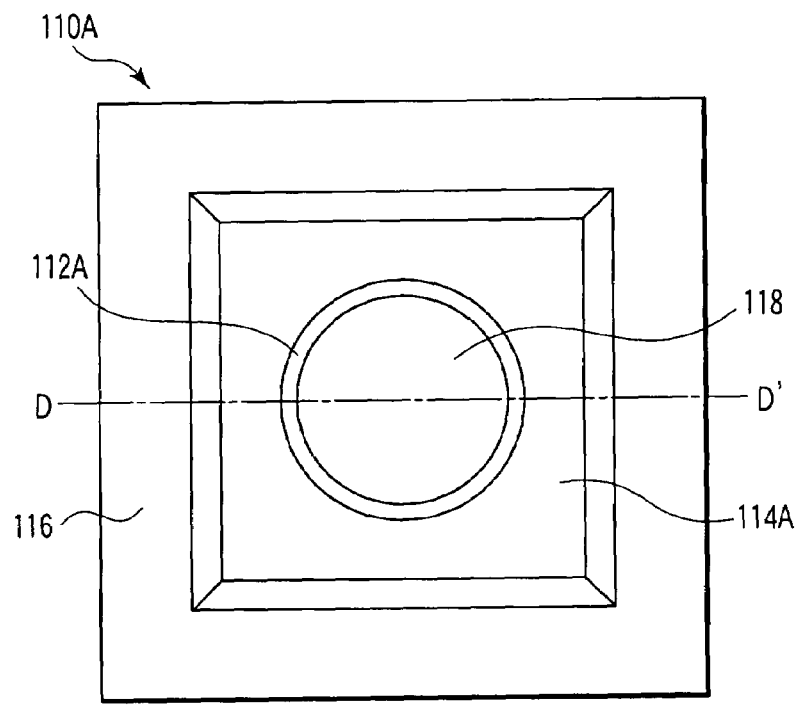
FIG. 17 is a top view of a mirror substrate according to a modification to the first embodiment of the present invention.
Figure 18:
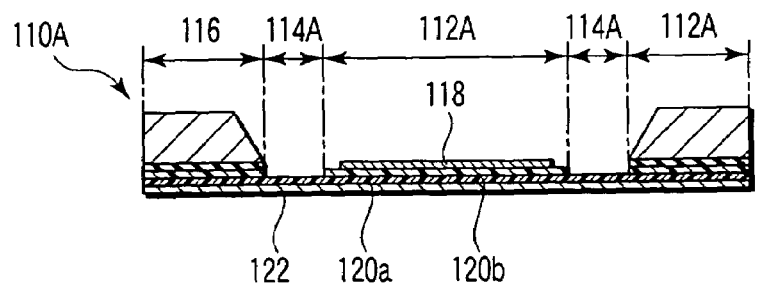
FIG. 18 is a sectional view taken along the line D–D' of FIG. 17.

FIG. 17 is a top view of a mirror substrate according to a modification to the first embodiment of the present invention. FIG. 18 is a sectional view taken along the line D–D' of FIG. 17. As shown in FIGS. 17 and 18, in a mirror substrate 110A according to this modification, a membrane 112A comprises a laminated body with a two-layer structure. The two-layer structure includes a first thin-film layer 120a and a second thin-film layer 120b. A connecting portion 114A comprises part of the laminated body constituting the membrane 112A, that is, the first thin-film layer 120a. Namely, the first thin-film layer 120a is formed to cover the fixing portion 116, connecting portion 114A, and membrane 112A entirely. Meanwhile, the second thin-film layer 120b is formed to cover only the fixing portion 116 and membrane 112A. First, the second thin-film layer 120b is formed to cover the fixing portion 116, connecting portion 114A, and membrane 112A entirely, in the same manner as the first thin-film layer 120a. After that, that portion of the second thin-film layer 120b which is located on the connecting portion 114A is removed. In this manner, while the membrane 112A comprises the first and second thin-film layers 120a and 120b, the connecting portion 114A comprises only the first thin-film layer 120a. Hence, the mechanical stiffness of the connecting portion 114A is smaller than that of the membrane 112A. The first thin-film layer 120a is desirably formed of a material softer than that of the second thin-film layer 120b. In the mirror substrate 110A of this modification, the connecting portion 114A is not provided with through holes that make it a mesh. Thus, the membrane 112A is supported by the entire surface of the connecting portion 114A. When compared to the mesh-type connecting portion 114, the connecting portion 114A is advantageous in terms of fatigue or the like and easy to fabricate. In the structure of the connecting portion 114A according to this modification, the polyimide film is largely influenced by fatigue. Hence, this structure is particularly advantageous when the connecting portion 114A comprises a polyimide film.

Second Embodiment

The second embodiment will be described with reference to the views of the drawing. This embodiment is directed to an arrangement in which deformation of the reflection surface of the connecting portion in the main deforming direction is restricted by using an electromagnetic force.

Figure 19:
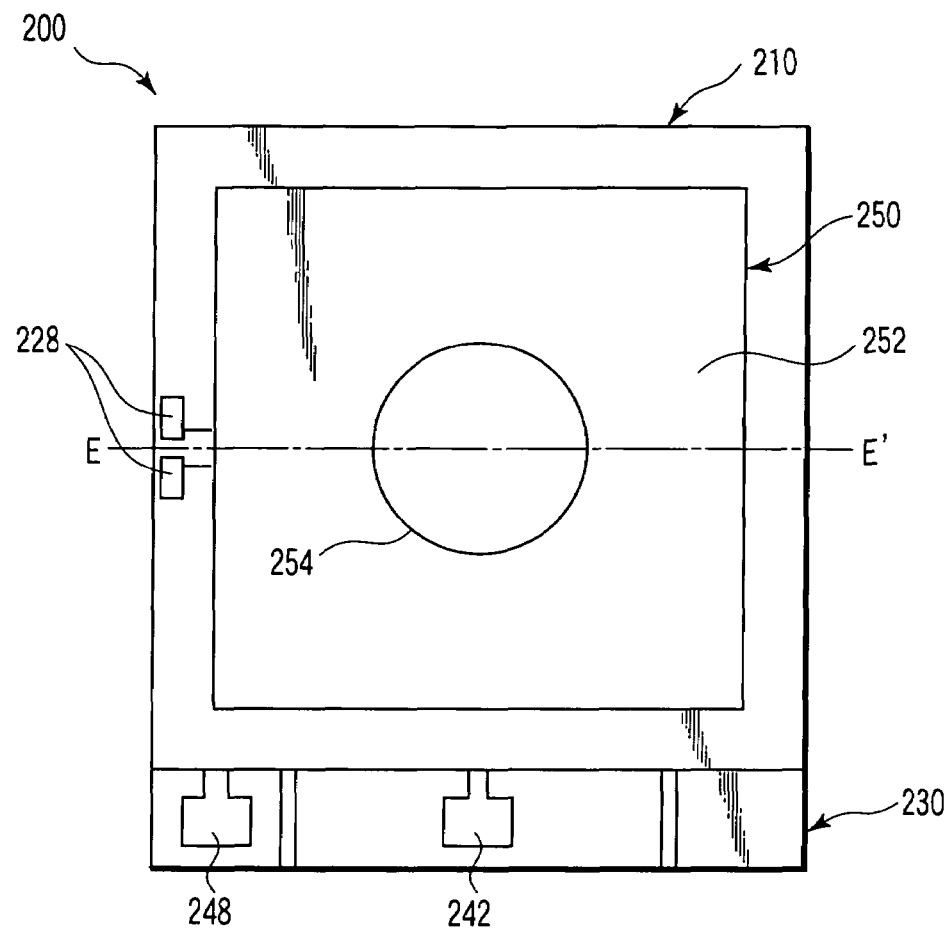
FIG. 19 is a top view of a deformable mirror according to the second embodiment of the present invention.
Figure 20:
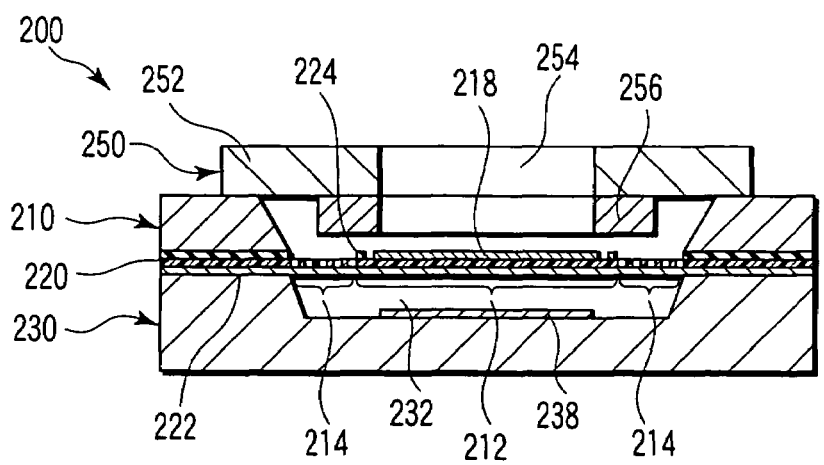
FIG. 20 is a sectional view taken along the line E–E' of FIG. 19.

FIG. 19 is a top view of a deformable mirror according to the second embodiment of the present invention. FIG. 20 is a sectional view taken along the line E–E' of FIG. 19.

As shown in FIGS. 19 and 20, a deformable mirror 200 according to this embodiment comprises a mirror substrate 210, an electrode substrate 230, and a magnet substrate 250. The mirror substrate 210, electrode substrate 230, and magnet substrate 250 are bonded to each other.

Figure 21:
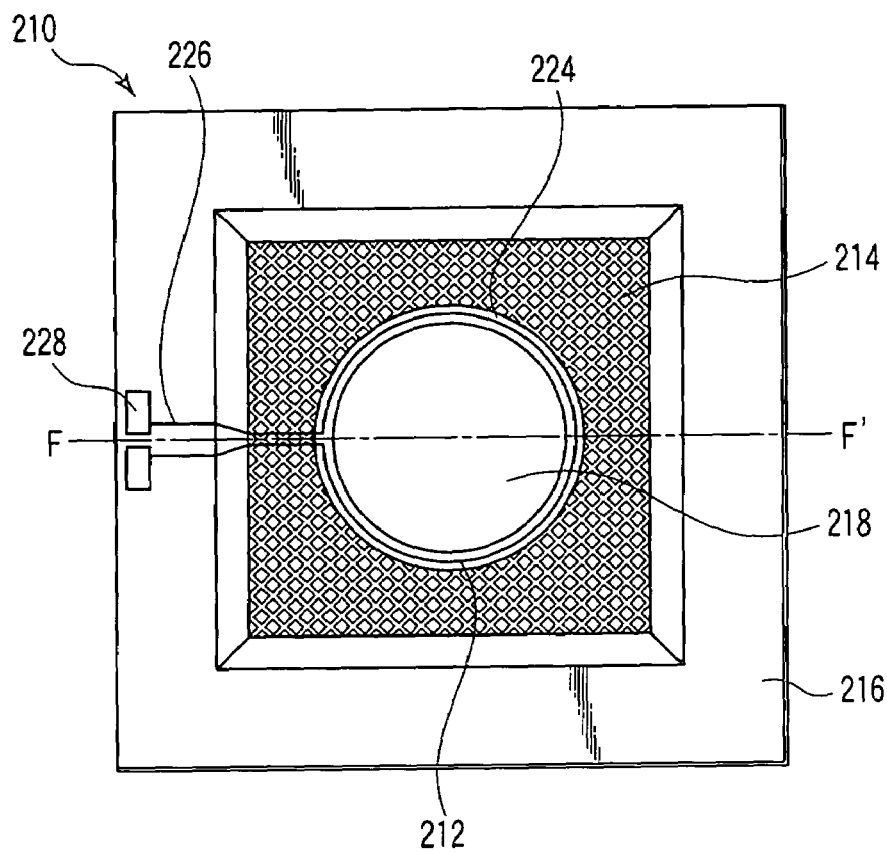
FIG. 21 is a top view of the mirror substrate shown in FIG. 19.
Figure 22:
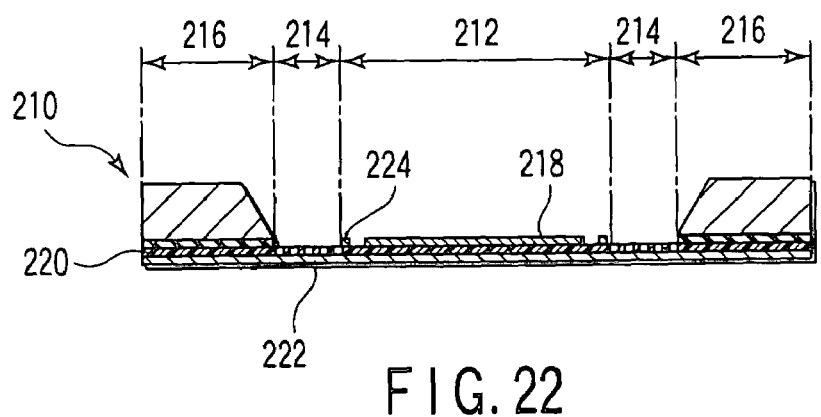
FIG. 22 is a sectional view taken along the line F–F' of FIG. 21.

FIG. 21 is a top view of the mirror substrate shown in FIG. 19. FIG. 22 is a sectional view taken along the line F–F' of FIG. 21.

As shown in FIGS. 21 and 22, the mirror substrate 210 has a membrane 212, a connecting portion 214 surrounding the membrane 212, and a fixing portion 216 fixing the peripheral portion of the connecting portion 214. A reflection surface 218 is formed on the upper surface (the surface that corresponds to the upper side in FIG. 22) of the membrane 212. The mirror substrate 210 is fabricated from a silicon substrate. Both the membrane 212 and connecting portion 214 comprise a polyimide thin film extending from the fixing portion 216. The membrane 212 constitutes a deforming portion, and the connecting portion 214 constitutes another deforming portion. The connecting portion 214 is provided with many through holes so as to form a mesh, and has lower mechanical stiffness than that of the membrane 212. The membrane 212 and connecting portion 214 are provided with a conductive thin film 222 on their entire surfaces (until the fixing portion 216) that are opposite to a surface where the reflection surface 218 is formed. The conductive thin film 222 constitutes a GND layer in electrostatic driving that deforms the membrane 212 (to be described later). The reflection surface 218 is smaller than the membrane 212. A coil 224, which circularly extends around the reflection surface 218, is formed within the membrane 212 and outside the reflection surface 218. The coil 224 is electrically connected to coil extending electrodes 228 through coil wiring lines 226. The coil extending electrodes 228 are arranged on the upper surface of the fixing portion 216. The coil wiring lines 226 extend above the connecting portion 214 and fixing portion 216.

Figure 23:
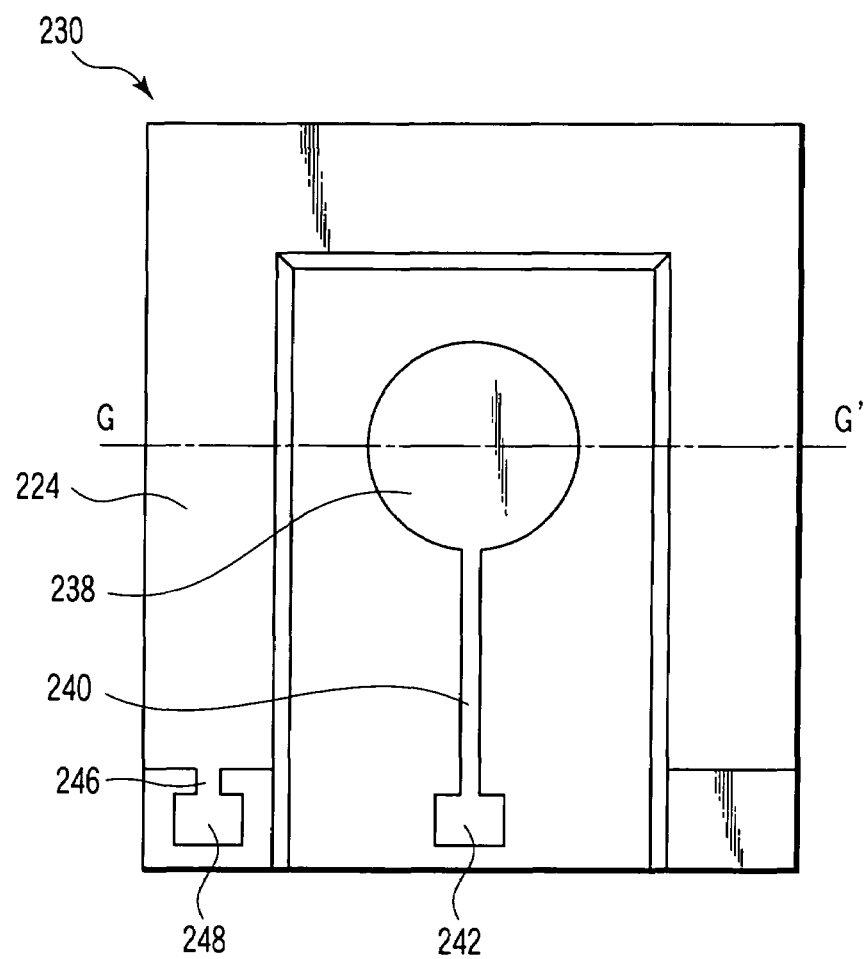
FIG. 23 is a top view of the electrode substrate shown in FIG. 19.
Figure 24:
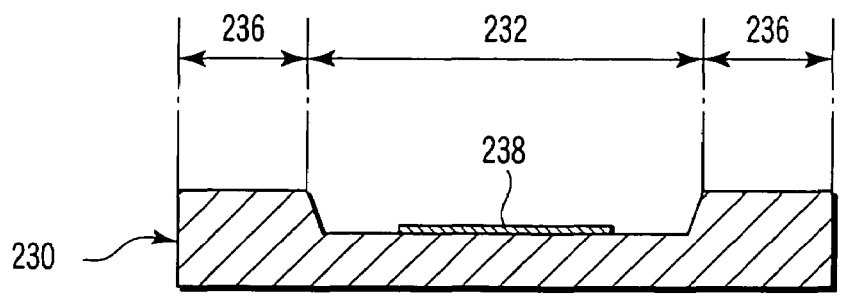
FIG. 24 is a sectional view taken along the line G–G' of FIG. 23.

FIG. 23 is a top view of the electrode substrate shown in FIG. 19. FIG. 24 is a sectional view taken along the line G–G' of FIG. 23.

As shown in FIGS. 23 and 24, the electrode substrate 230 is provided with a recess 232 at a portion that opposes the membrane 212 and connecting portion 214. The recess 232 corresponds to an electrostatic gap. The electrode substrate 230 is also provided with a driving electrode 238 at a position that opposes the membrane 212 when the electrode substrate 230 is bonded to the mirror substrate 210. The driving electrode 238 is electrically connected to a driving-electrode extending electrode 242 through a driving-electrode wiring line 240. A bonding portion 236 of the electrode substrate 230 opposes the fixing portion 216 when bonded to the mirror substrate 210. The bonding portion 236 is provided with a conductive thin film 244. The conductive thin film 244 is electrically connected to a GND extending electrode 248 through a wiring line 246. The electrode substrate 230 is fabricated from a silicon substrate. The electrode substrate 230 is larger than the mirror substrate 210. As shown in FIG. 19, the driving-electrode extending electrode 242 and GND extending electrode 248 are formed on the electrode substrate 230 at a portion that extends outside the mirror substrate 210 when the mirror substrate 210 is bonded to the electrode substrate 230.

Figure 25:
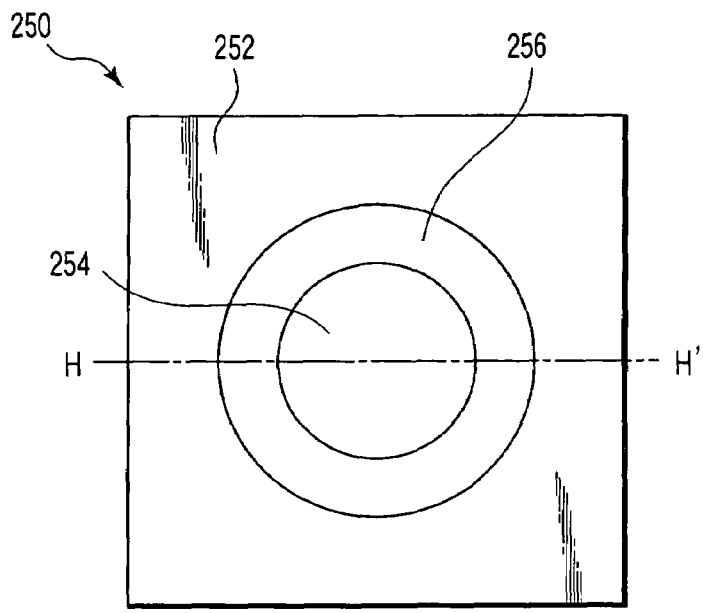
FIG. 25 is a top view of the magnet substrate shown in FIG. 19.
Figure 26:
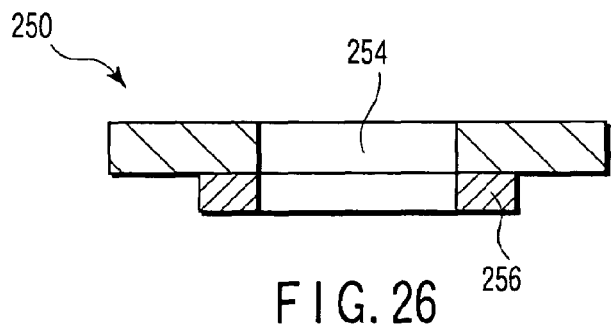
FIG. 26 is a sectional view taken along the line H–H' of FIG. 25.

FIG. 25 is a top view of the magnet substrate shown in FIG. 19. FIG. 26 is a sectional view taken along the line H–H' of FIG. 25.

As shown in FIGS. 25 and 26, the magnet substrate 250 has a magnet holder 252 and a cylindrical permanent magnet 256, which is bonded to the magnet holder 252. The magnet holder 252 is provided with a circular opening 254 at a position that opposes the membrane 212 when the magnet holder 252 is bonded to the mirror substrate 210. The cylindrical permanent magnet 256 has an inner diameter substantially equal to that of the circular opening 254 of the magnet holder 252. The permanent magnet 256 is fixed to the magnet holder 252 so that its inner diameter and the opening 254 are almost coaxial. The cylindrical permanent magnet 256 is polarized in the vertical direction, i.e., along the axis of the cylinder. The magnet holder 252 is fabricated from a silicon substrate. This minimizes the thermal deformation of the magnet holder 252 upon application of heat to the deformable mirror 200 of this embodiment.

As shown in FIGS. 19 and 20, the mirror substrate 210 and electrode substrate 230 are bonded through the fixing portion 216 and bonding portion 236 such that the membrane 212 opposes the driving electrode 238. Thus, the membrane 212 of the mirror substrate 210 is electrically connected to the conductive thin film 244 of the electrode substrate 230. That portion of the conductive thin film 222 which is located on the membrane 212 of the mirror substrate 210 opposes the driving electrode 238 of the electrode substrate 230 at a gap. The opposing portion of the conductive thin film 222 and the driving electrode 238 constitute deforming means or a deformer for deforming the membrane 212 and connecting portion 214. In other words, that portion of the conductive thin film 244 which is located on the membrane 212 serves as a counter electrode with respect to the driving electrode 238. The counter electrode and the driving electrode 238 constitute electrostatic driving that deforms the membrane 212 with an electro-static force. The mirror substrate 210 and magnet substrate 250 are bonded to expose the reflection surface 218 through the opening 254 of the magnet holder 252. Hence, the coil 224 and permanent magnet 256 are located close to each other to oppose each other. The coil 224 and permanent magnet 256 constitute restricting means or a restrictor for restricting deformation in the main restricting direction of the connecting portion 214 of the mirror substrate 210. The permanent magnet 256 constitutes magnetic field generating means or a magnetic field generator for supplying a magnetic field to the coil 224. The coil 224 serves as a driving coil that cooperates with the permanent magnet 256 to supply a force to the connecting portion 214.

Figure 27:
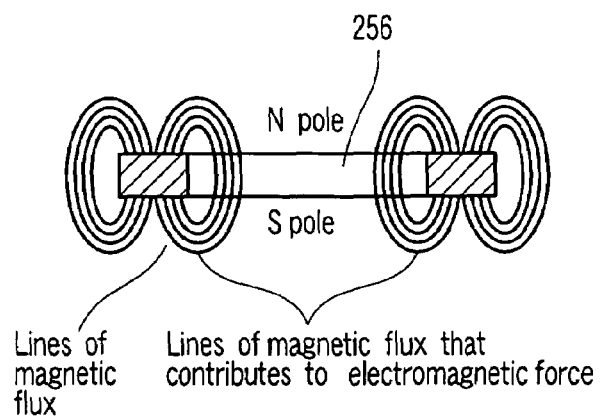
FIG. 27 shows lines of magnetic flux generated by the permanent magnet shown in FIG. 26.

FIG. 27 shows lines of magnetic flux generated by the permanent magnet 256 shown in FIG. 26. As shown in FIG. 27, the lines of magnetic flux of the permanent magnet 256 extend around the direction of the thickness of the cylinder. The lines of magnetic flux include two types with reference to the center of the width of the cylinder as the boundary. According to one type, the lines of magnetic flux run inside the cylinder. According to the other type, the lines of magnetic flux run outside the cylinder. According to this embodiment, the lines of magnetic flux running inside the cylinder are used to generate the electromagnetic force.

Figure 29:
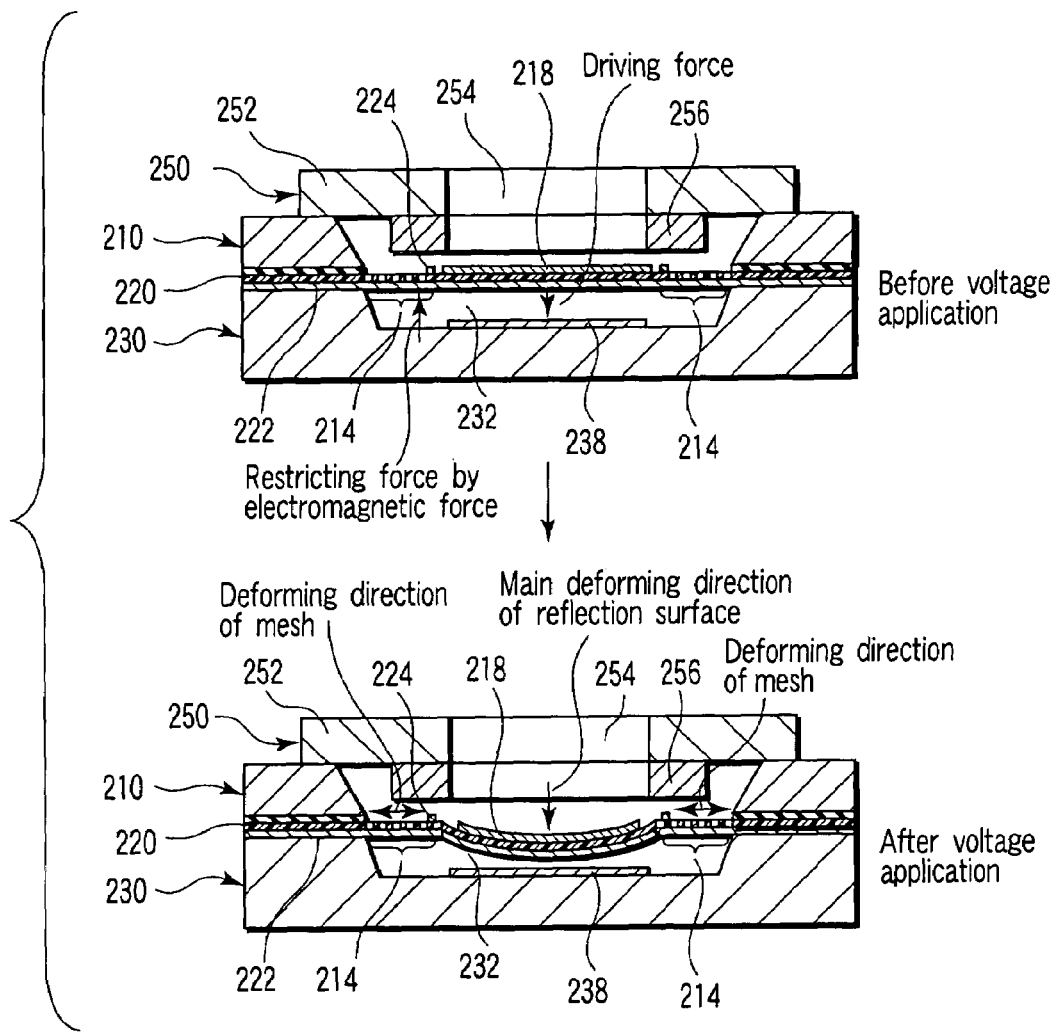
FIG. 29 shows how the reflection surface is deformed by an electro-static force and an electromagnetic force that are generated in response to voltage application of FIG. 28.

FIG. 28 shows an arrangement that applies a voltage for electrostatic driving that deforms the reflection surface of the deformable mirror shown in FIG. 19, and an arrangement that applies a current for generating a restricting force that restricts deformation of the connecting portion of the deformable mirror. FIG. 29 shows how the reflection surface is deformed by an electro-static force and an electromagnetic force that are generated in response to voltage application of FIG. 28.

As shown in FIG. 28, a DC power supply 292 and a switch 294 are connected in series between the GND extending electrode 248 and driving-electrode extending electrode 242. A DC power supply 296 and a switch 298 are connected in series between the pair of coil extending electrodes 228. Assume that the switch 294 is closed and that a driving voltage is applied between the GND extending electrode 248 and driving-electrode extending electrode 242. Then, an electro-static force that acts toward the driving electrode 238 is generated in the reflection surface 218. Assume that the switch 298 is closed and that a current is applied to the coil 224. Then, an electromagnetic force that acts toward the permanent magnet 256 is generated in the coil 224 located outside the membrane 212. When the electro-static force and electromagnetic force are balanced, the membrane 212 having the reflection surface 218 deforms toward the driving electrode 238, as shown in FIG. 29. As the connecting portion 214 forms a mesh, its overall mechanical stiffness is lower than that of the membrane 212. Hence, when the membrane 212 is deformed by the driving force, the connecting portion 214 may undesirably start deformation. However, the connecting portion 214 is pulled toward the permanent magnet 256 by the electromagnetic force generated in the coil 224. Thus, the connecting portion 214 located outside the circumference of the membrane 212 cannot deform in the main deforming direction of the reflection surface 218.

The deformable mirror 200 according to this embodiment does not have a slidable portion, unlike in the first embodiment, which uses a projection. Thus, deformation of the reflection surface 218 is not interfered with by a frictional force, or the reflection surface 218 will not be broken by wear. The mesh formed in the connecting portion 214 deforms in a direction to relax the tensile stress occurring in the planar direction of the membrane 212. Thus, the tensile stress occurring in the membrane 212 is decreased largely. More specifically, as shown in FIG. 29, as the mesh extends in its planar direction to relax the tensile stress, the membrane 212 (i.e., the reflection surface 218) can deform largely.

In the deformable mirror 200 of this embodiment, when the membrane 212 deforms, the through holes in the mesh portion formed in the connecting portion 214 enlarge. Accordingly, the tensile stress occurring in the membrane 212 is relaxed. Thus, the membrane 212 can be easily, largely deformed. This is apparent from the above description.

Various changes and modifications can naturally be made in the respective arrangements of this embodiment.

Figure 30:
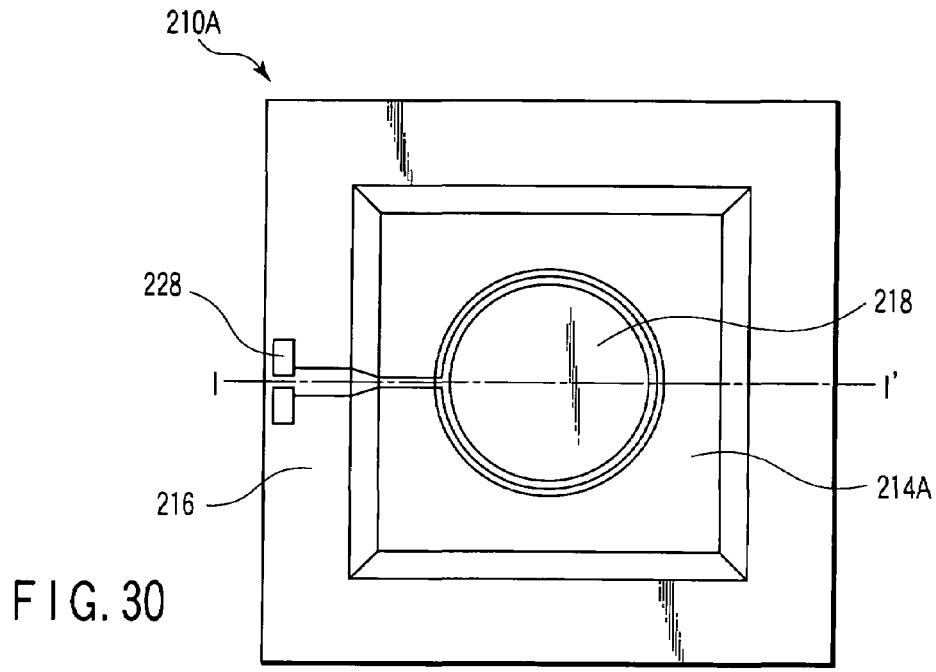
FIG. 30 is a top view of a mirror substrate according to a modification to the second embodiment of the present invention.
Figure 31:
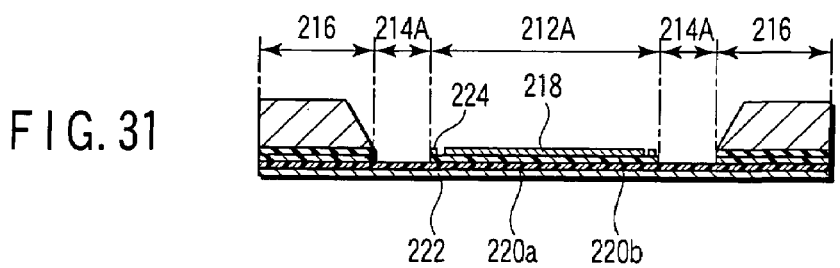
FIG. 31 is a sectional view taken along the line I–I' of FIG. 30.
Figure 32:
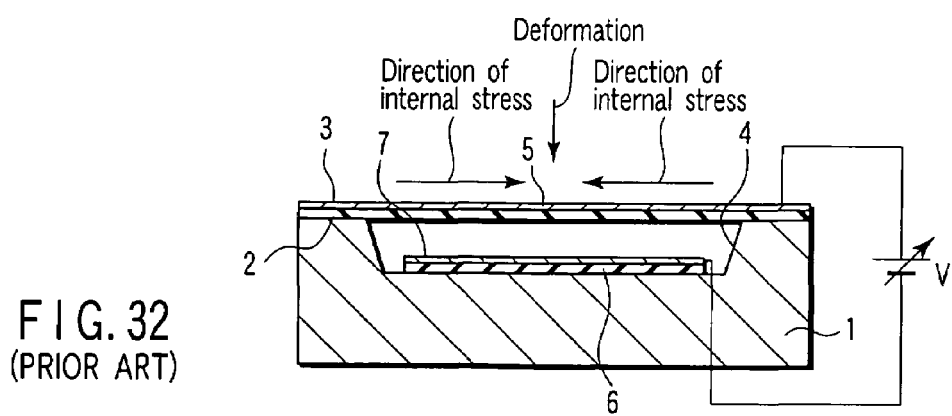
FIG. 32 shows a deformable mirror disclosed in Jpn. Pat. Appln. KOKAI Publication No. 2-101402.

FIG. 30 is a top view of a mirror substrate according to a modification to the second embodiment of the present invention. FIG. 31 is a sectional view taken along the line I–I' of FIG. 30. As shown in FIGS. 30 and 31, in a mirror substrate 210A according to this modification, a membrane 212A comprises a laminated body with a two-layer structure. The two-layer structure includes a first thin-film layer 220a and a second thin-film layer 220b. A connecting portion 214A comprises part of a laminated body constituting the membrane 212A, that is, the first thin-film layer 220a. Namely, the first thin-film layer 220a is formed to cover the fixing portion 216, connecting portion 214A, and membrane 212A entirely. Meanwhile, the second thin-film layer 220b is formed to cover only the fixing portion 216 and membrane 212A. First, the second thin-film layer 220b is formed to cover the fixing portion 216, connecting portion 214A, and membrane 212A entirely, in the same manner as the first thin-film layer 220a. After that, that portion of the second thin-film layer 220b which is located on the connecting portion 214A is removed. In this manner, while the membrane 212A comprises the first and second thin-film layers 220a and 220b, the connecting portion 214A comprises only the first thin-film layer 220a. Hence, the mechanical stiffness of the connecting portion 214A is smaller than that of the membrane 212A. The first thin-film layer 220a is desirably formed of a material softer than that of the second thin-film layer 220b. In the mirror substrate 210A of this modification, the connecting portion 214A is not provided with through holes that make it a mesh. Thus, the membrane 212A is supported by the entire surface of the connecting portion 214A. When compared to the mesh-type connecting portion 214, the connecting portion 214A is advantageous in terms of fatigue or the like and easy to fabricate. The coil wiring lines 226 extending from the coil 224 to the coil extending electrodes 228 are formed on the connecting portion 214A more easily than on the mesh-type connecting portion 214.

In the second embodiment of the present invention, the driving electrode 238 may comprise electrode portions that are electrically independent of each other, in the same manner as in the modification to the first embodiment shown in FIG. 13. In this case, the driving-electrode wiring line 240 and driving-electrode extending electrode 242 are changed to driving-electrode wiring lines and driving-electrode extending electrodes, respectively. The electrode portions are electrically connected to the driving-electrode extending electrodes through the driving-electrode wiring lines, respectively.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A deformable mirror comprising:
   a first deforming portion that has a reflection surface;
   a second deforming portion surrounding the first deforming portion and having lower mechanical stiffness than that of the first deforming portion;
   a fixing portion fixing a peripheral portion of the second deforming portion;
   a deformer that acts on the first deforming portion to deform the first deforming portion and second deforming portion; and
   a restrictor that restricts deformation in a main deforming direction of a portion of the first deforming portion that is outside an operation region of the deformer.

2. A deformable mirror according to claim 1, wherein the first deforming portion comprises a laminated body including multi-layer, and the second deforming portion comprises part of the laminated body of the first deforming portion.

3. A deformable mirror according to claim 2, wherein the deformer has a first electrode that is provided to the first deforming portion and a second electrode that opposes the first electrode, the second electrode comprising portions electrically independent of each other, and the restrictor comprises a projection having a tip that is configured to come into contact with a surface of the first deforming portion that is opposite to the reflection surface, the projection extending circularly.

4. A deformable mirror according to claim 2, wherein the deformer has a first electrode that is provided to the first deforming portion and a second electrode that opposes the first electrode, the second electrode comprising portions electrically independent of each other, and the restrictor comprises a driving coil that is provided outside an operation region of the deformer of the first deforming portion and magnetic field generating means for supplying a magnetic field to the driving coil.

5. A deformable mirror according to claim 2, wherein the deformer has a first electrode that is provided to the first deforming portion and a second electrode that opposes the first electrode, and the restrictor comprises a projection having a tip that is configured to come into contact with a surface of the first deforming portion that is opposite to the reflection surface, the projection extending circularly.

6. A deformable mirror according to claim 2, wherein the deformer has a first electrode that is provided to the first deforming portion and a second electrode that opposes the first electrode, and the restrictor comprises a driving coil that is provided outside an operation region of the deformer of the first deforming portion and magnetic field generating means for supplying a magnetic field to the driving coil.

7. A deformable mirror according to claim 1, wherein the second deforming portion and first deforming portion comprise films made of the same material, and the second deforming portion is provided with a large number of through holes to form a mesh.

8. A deformable mirror according to claim 7, wherein the deformer has a first electrode that is provided to the first deforming portion and a second electrode that opposes the first electrode, the second electrode comprising portions electrically independent of each other, and the restrictor comprises a projection having a tip that is configured to come into contact with a surface of the first deforming portion that is opposite to the reflection surface, the projection extending circularly.

9. A deformable mirror according to claim 7, wherein the deformer has a first electrode that is provided to the first deforming portion and a second electrode that opposes the first electrode, the second electrode comprising portions electrically independent of each other, and the restrictor comprises a driving coil that is provided outside an operation region of the deformer of the first deforming portion and magnetic field generating means for supplying a magnetic field to the driving coil.

10. A deformable mirror according to claim 7, wherein the deformer has a first electrode that is provided to the first deforming portion and a second electrode that opposes the first electrode, and the restrictor comprises a projection having a tip that is configured to come into contact with a surface of the first deforming portion that is opposite to the reflection surface, the projection extending circularly.

11. A deformable mirror according to claim 7, wherein the deformer has a first electrode that is provided to the first deforming portion and a second electrode that opposes the first electrode, and the restrictor comprises a driving coil that is provided outside an operation region of the deformer of the first deforming portion and magnetic field generating means for supplying a magnetic field to the driving coil.

12. A deformable mirror according to claim 1, wherein the deformer has a first electrode that is provided to the first deforming portion and a second electrode that opposes the first electrode.

13. A deformable mirror according to claim 12, wherein the second electrode comprises portions electrically independent of each other.

14. A deformable mirror according to claim 13, wherein the restrictor comprises a driving coil that is provided outside an operation region of the deformer of the first deforming portion and magnetic field generating means for supplying a magnetic field to the driving coil.

15. A deformable mirror according to claim 13, wherein the restrictor comprises a projection having a tip that is configured to come into contact with a surface of the first deforming portion that is opposite to the reflection surface, the projection extending circularly.

16. A deformable mirror according to claim 12, wherein the restrictor comprises a driving coil that is provided outside an operation region of the deformer of the first deforming portion and magnetic field generating means for supplying a magnetic field to the driving coil.

17. A deformable mirror according to claim 12, wherein the restrictor comprises a projection having a tip that is configured to come into contact with a surface of the first deforming portion that is opposite to the reflection surface, the projection extending circularly.

18. A deformable mirror according to claim 1, wherein the restrictor comprises a projection having a tip that is configured to come into contact with a surface of the first deforming portion that is opposite to the reflection surface.

19. A deformable mirror according to claim 18, wherein the projection extends circularly.

20. A deformable mirror according to claim 1, wherein the restrictor comprises a driving coil that is provided outside an operation region of the deformer of the first deforming portion and magnetic field generating means for supplying a magnetic field to the driving coil.

* * * * *